United States Patent Office 3,514,279
Patented May 26, 1970

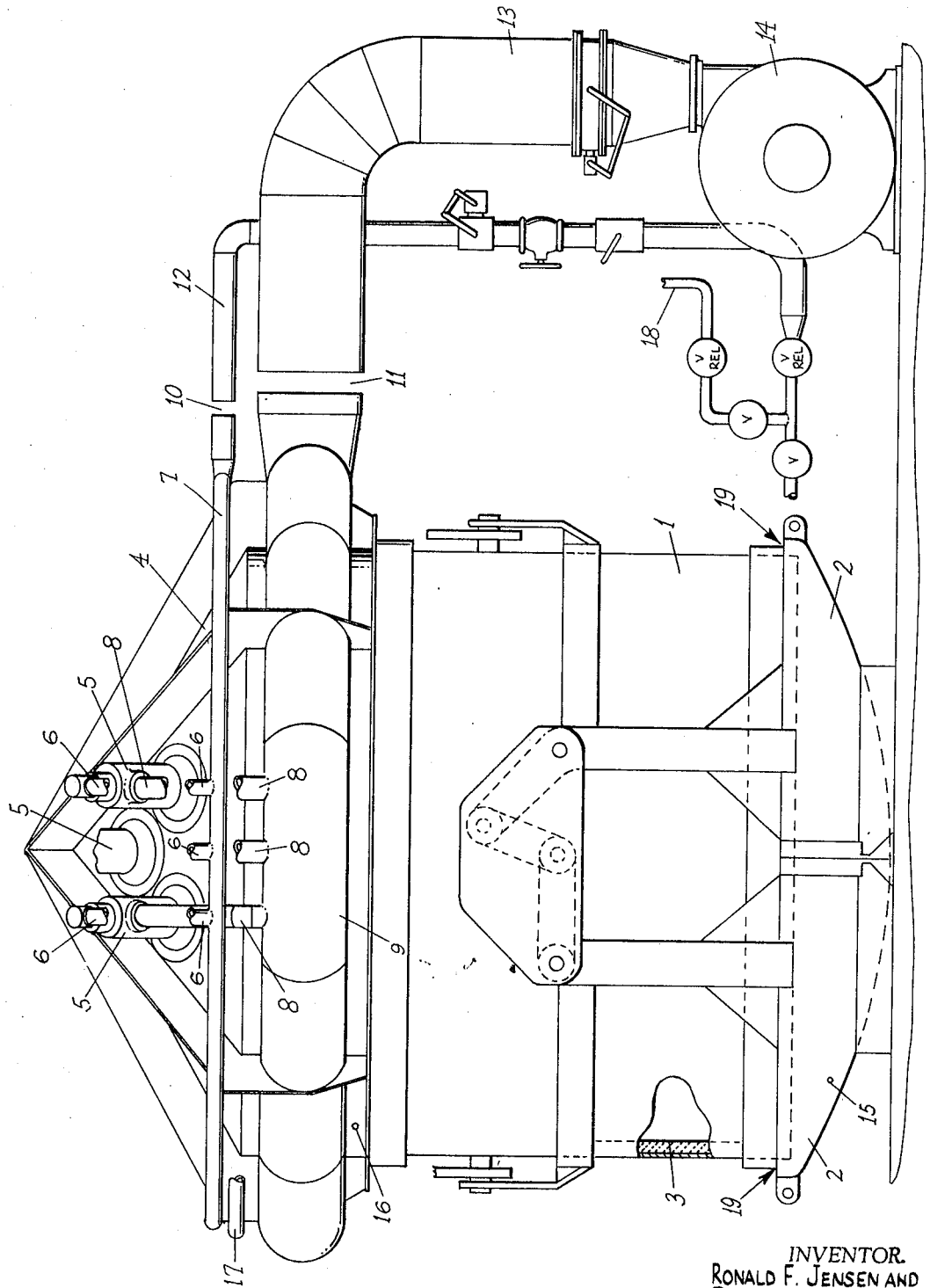

3,514,279
PREHEATING SCRAP WITH CONTROLLED OXIDATION
Ronald F. Jensen, Houston, Tex., and Paul E. Phillips, Independence, Mo., assignors to Armco Steel Corporation, Middletown, Ohio, a corporation of Ohio
Continuation of application Ser. No. 410,592, Nov. 12, 1964. This application Feb. 9, 1968, Ser. No. 706,748
Int. Cl. C21b 1/00; C22b 7/00
U.S. Cl. 75—43                    7 Claims

ABSTRACT OF THE DISCLOSURE

A proess for preheating scrap metal for use in electric furnaces, basic oxygen furnaces and the like wherein scrap is charged into a refractory lined vessel and heated at a rate of 28,000 B.t.u.'s per minute per ton or more for not more than about one-half hour.

---

This application is a continuation of the copending case entitled Preheating Scrap With Controlled Oxidation, filed Nov. 12, 1964, Ser. No. 410,592, in the name of the same inventors and now abandoned.

In a number of iron and steel making processes, the use of scrap metal is an economic or practical necessity, as is well known in the art. Such processes include those caried on in open hearth furnaces, in electric furnaces, and in basic oxygen furnaces such as those in which the molten metal is blown with oxygen from lances located at or above the slag level. There are steel plants which lack an unlimited supply of hot metal and are so located that the greater part of the charge must be made up of scrap.

It has hitherto been suggested that thermodynamic savings could be effected if the scrap could be heated to a high temperature but generally short of the melting temperature before charging. The melting of cold scrap, particularly in electric arc furnaces is a matter of substantial expense due to the cost of electric power and electrodes involved.

Past efforts to preheat the scrap have not met with success and have been characterized by low thermodynamic efficiency for a number of reasons. For one thing, it was not believed possible to effect an adequate heating of the scrap without substantial oxidation thereof, particularly where the scrap existed in the form of pieces of sheet gauge or finer particles such as shavings and turnings. Oxidation of the scrap was regarded as a loss of iron values which would either go into the slag or would be difficult and expensive to recover.

For another thing, it was found difficult to preheat any large quantity of scrap evenly throughout the mass. As a consequence, some parts of the scrap charge were overheatetd and brought to fusion and melting temperatures, making it difficult or impossible to remove the heated scrap from the heating vessel. In order to reduce localized melting and develop a more even temperature distribution, excess air was employed to increase gas velocity. This resulted in excessive oxidation. To reduce the oxidation in the charge, it was necessary to restrict the top temperature in the charge to 1600° F. This resulted in a maximum average scrap preheat temperature in the mass of around 1000° F.

The results were that the heating cycles in former attempts were quite lengthy, being three to four hours or longer, and thermal efficiencies approached 50%. The whole electric furnace operation is only about two and one-half to three hours from charge to tap. The basic oxygen process is sometimes accomplished in as little as one-half hour. Thus it becomes evident that any scrap preheating process would have to be accomplished in something less than half an hour's time, or it would be too slow to be adaptable to modern steel making processes.

The net result of former efforts was the teaching that the scrap metal could not be effectively heated to a temperature above about 1600° F. Attempts to heat to 2000° F. resulted in as much as 16% oxidation of the total scrap charge. A 1600° F. maximum temperature was not high enough for the realization of the greatest thermodynamic benefits, and the preheating of scrap has not hitherto attained any substantial commercial importance.

The primary objects of this invention lie in a solution of problems such as those to which reference has been made above. The more specific objects can best be outlined or will be apparent to the skilled worker in the art as the ensuing description proceeds. Reference is made to the drawing showing a semi-diagrammatic representation of the preheating device of the present invention.

First, the mechanical problems have been solved by carrying on the preheating in a vessel which is or is similar to a standard charging bucket for an electric arc furnace. This is a cylindrical vessel 1 of ladle-like form, the bottom of which is closed by movable clam shell-type doors 2. The device is lined with refractory 3 which is preferably capable of withstanding temperature up to about 3000° F.

A removable refractory lined hood 4, roughly dome shaped is used in connection with the charging bucket. A number of burners (some of which are shown at 5) for mobile fuel extend through the top portion of the hood and are so directed as to throw the flames toward the central portion of the charging bucket. Connections 6 for mobile fuel are made to the burners from a fuel delivery manifold 7 and air for combustion is supplied by connections 8 from a bustle pipe 9 mounted on the hood. The manifold 7 and butle pipe 9 have quick release connections (diagrammatically indicated at 10 and 11 respectively) with a conduit 12 to a source of fuel (not shown) and a conduit 13 to a source of air under pressure, e.g. a blower 14. It will be understood that the connections 10 and 11 may be flexible ones enabling the hood 4 to be swung away from the vessel 1, or raised upwardly so that the vessel may be moved laterally from beneath the hood. When the burners are provided with pilots (not shown) a premixed gas-air supply is furnished to the pilots from a manifold 17 connected to a fuel source by a coduit 18. Any mobile fuel may be used, but natural gas where available is preferred. As will be understood by one skilled in the art, means may be provided for automatically regulating the flow of fuel and air. Such means (not shown) may be controlled by thermocouples located in the clam shell doors and in the hood (as at 15 and 16).

The clam shell bottom of the charging bucket need not be refractory lined, but in any event is provided with means for the exit of products of combustion. The exhaust gas discharrge area of these means should be such that at desirable burner velocities the heating vessel may be maintained under a relatively high positive pressure, on the order of up to six inches of water. It has been found that heat transfer efficiency, heat diffusion and channeling in the vessel are affected by back pressure, which is a direct function of exhaust gas area. It is within the scope of the invention to provide required holes or ports of appropriate cross section for the purpose of controlling the pressure in the vessel. In the embodiment of the heating vessel, as shown in FIG. 1, the desired exhaust orifice area 19 has been obtained by controlling exhaust gas exit around the periphery of the charging bucket between the clam shell discharge doors 2 and the body of the charging bucket 1. The provision of bottom exit means for the products of combustion and the provision of a positive pressure within the vessel, along with judicious scrap placement, contribute to the penetration of the scrap by the flames and to the more uniform heating of the scrap charge. Heat transfer efficiencies of 80% are readily attained in the process.

Second, the present process is made possible by certain considerations which will now be outlined. Hitherto as has been stated, the endeavor has been to get as much heat into the scrap as could be done while tending to avoid oxidation for fear of over-oxidizing (which was regarded as a loss of metal). Prior art workers did not fully realize that some oxidation of the scrap may be highly desirable depending upon the circumstances of use. In the making of low carbon steels, a quantity of oxygen from some source is required to bring down the carbon content. One skilled in the art will realize that this is one reason why mill scale, iron ore or oxygen is added to an electric furnace heat. In the present practice a partially oxidized condition of the scrap can be used as a source of iron oxide for the lowering of the carbon in the melt. This means that in the preferred practice of the invention the degree or amount of oxidation of the scrap is proportioned to the carbon content of the raw materials being melted.

It will be understood that conditions will vary with different operations. As is well known to one skilled in the art, a charge for a heat made up, to a substantial degree, of either molten pig metal or cold pig metal will melt-in with a substantially higher carbon content than a heat made up from an all steel scrap charge. Thus the degree of oxidation in the preheated charge should be considerably higher, and controlled to be proportional to the estimated melt-in carbon of the charge.

By the same token, a charge for a heat made up largely of steel scrap would have a lower melt-in carbon content, and thus the degree of oxidation of the preheated steel scrap charge will be controlled to a considerably lower value to compensate for the estimated lower melt-in carbon content. Nevertheless, it has been found that some oxidation of the preheated scrap is not only permissible but desirable.

Another advantage of the present process is that through controlled oxidation the thermal efficiency is increased up to 90% in some types of scrap charges. This is far above the expectations of one skilled in the art.

There are conditions where some oxidation is thermodynamically desirable. The chemical change of iron to FeO is an exothermic reaction which generates heat and helps to raise the temperature of the scrap. It requires about 575 B.t.u.'s to bring one pound of iron to a temperature of about 2900° F. The oxidation of a pound of iron generates about 2150 B.t.u.'s, so that such oxidation of one pound of iron will produce enough heat to raise about four pounds of iron to the desired temperature. The heat generated by oxidation is very efficiently absorbed by the scrap since it is a reaction effected at the scrap surface. It must be remembered, however, that the reduction of iron by means of carbon is an endothermic reaction in which about 1300 B.t.u.'s will be consumed. In spite of this endothermic reaction, thermochemical calculations reveal and production statistics prove that the net thermal result is exothermic if carbon is in solution and the iron oxide is hot. Another advantage of controlled oxidation of the scrap lies in the more even and more rapid heating of the scrap charge throughout its mass because the heating of any particular scrap portion is not dependent solely upon the direct flame impingement.

The degree of oxidation nevertheless has to be controlled in accordance with the nature of the charge. For example, in the case of furnace charges which comprise substantial quantities of molten pig metal there will be roughly about 4% of carbon which it is desirable to remove, and hence substantial oxidation can be utilized. In the case of cold charge heats, i.e. where the charge consists essentially of steel scrap, there will not be as much carbon for removal and a lesser amount of oxidation will be used. In any event, it is desirable to control the degree of oxidation in the preheating step in accordance with the quantity of carbon which should be removed from the heat. The quantity of carbon in the materials being melted can usually be estimated closely enough on the basis of experience, but in any case the carbon content can readily be ascertained by analysis.

A third facet of the invention lies in specific procedural steps whereby the charge can be uniformly and rapidly heated to a high temperature while oxidation is being controlled. In the preferred practice of the invention, the burners in the hood element are generally operated at or near stoichiometric proportions of gas and air, with only such excess air being used as will be required for the optimum degree of scrap oxidation. In the process of this invention (unlike prior art operations) it is not necessary to keep the flame temperature down, and the use of a large excess of air for this purpose is not required. The use of substantially stoichiometric proportions means a high flame temperature, e.g. around 3300° F. In prior operations the impingement of such a high temperature flame upon adjacent portions of the scrap mass would result in local heating up to the melting point as well as local over-oxidation.

These problems have been overcome by: (1) designing the vessel so as to restrict exhaust gas outlet area and to arrive at the high back pressure effect which has been found beneficial in promoting even temperature gradients and in reducing channeling. (2) The use of high fuel input rates from short flame, high heat release type burners, providing high gas velocity that can further increase vessel operating pressure. Prior practices have advocated a heat input rate of around 8,000 B.t.u.'s per minute per ton of metal heated. The present invention contemplates the use of at least 28,000 B.t.u.'s and preferably 40,000 B.t.u.'s or higher per minute per ton of metal heated, and the process achieves tremendously more uniform and faster heating along with equally higher heating efficiency with controlled oxidation.

The invention contemplates the use of flame temperatures less than 3300° F. as being desirable under some conditions. At flame temperatures in the range of 1600° F. to 3300° F. scrap will oxidize rapidly in the presence of excess air. A feature of this invention is to control oxidation within this critical temperature range. This can be done by one of three methods:

(1) Employ air in quantities less than stoichiometric proportions. This reduces flame temperature in proportion to the air deficiencies, i.e. oxygen deficiencies, and the scrap cannot be oxidized due to the present of the resulting combustibles, i.e. CO, $H_2$, etc.

(2) Recirculate the exhaust gases. When operating on stoichiometric ratio, the products of combustion will be neutral, i.e. neither oxidizing nor reducing, and recirculation of these gases back through the burners will lower flame temperatures while the gases remain non-oxidizing. Apparatus to accomplish this would involve exhaust gas collection and pumping equipment (not shown) to put the exhaust gases back into the vessel at or near the top.

(3) Utilization of coal or other solid fuel for oxidation control. The preferred practice under these conditions is to utilize coal as a means for burning excess air introduced at or near the burners 5, so as to reduce flame temperatures. Coal is charged at or near the top of the scrap mass. The volatiles are driven from the coal by the heat of the flames and pass downwardly through the scrap mass to the exit orifices at the bottom of the charging bucket. The volatiles will combust with excess air entering through the burners so as to prevent oxidation of the scrap charge. With the elimination of the volatiles, the coal forms a coke which will also burn with the excess air producing some CO and continuing to minimize scrap oxidation and increase the uniformity and rapidity of the scrap heating operation.

It may be noted that where a portion of the charge consists of chips, borings, or turnings with which oils and greases are associated, these hydrocarbonaceous substances are capable of acting in substantially the same way as the volatiles from the coal. Hence, if oily chips, borings, or turnings form a part of the charge, they are preferably located at the top thereof.

The use of a layer of coal or similar acting substance is not a limitation on the broader aspects of the invention; but such use forms a convenient way of minimizing oxidation during a very rapid heating cycle. In the practice of the invention, it is preferred to heat the scrap charge at least to an average temperature within the range of 2400° F. to 2,500° F., but lower temperatures may be used if desired, e.g. temperatures around or below 2000° F., within a short enough time to allow integration into steel making processes of the types set forth above. It is, of course, within the teachings of this invention to preheat scrap to yet lower temperatures, say 1800°, or 1600°, or even as low as 1000° F. if there are situations where these lower temperatures would have economic advantages. By the means and method set forth herein, oxidation of the scrap may readily be controlled from 0% to any desired percent while operating at any desired flame temperature, as required by the amount of carbon in the total charge or type of final melting process. It will be understood that standard combustion control valves will be employed in connection with the supply of fuel and air to the burners and that such controls may be utilized to apportion the amount of excess air entering the heating chamber through the burners. It does not involve a departure from the principles of the invention to use oxygen for the combustion; but this is not necessary and is not preferred because of cost considerations.

The invention contemplates that this preheating method can be economically used to assist all melting and smelting processes. The preheating of scrap as taught herein reduces the number of kilowatt hours required for an electric furnace heat and increases the production rate. It also cuts down the quantity of lanced oxygen required in a basic oxygen furnace, and increases the amount of scrap that can be used.

The use of a high gas velocity results in a low residence time of hot gases at the top of the scrap charge so that more heat will be transferred to the lower portions of the charge. It has been found desirable in the interest of improving heat transfer efficiencies to locate some finely divided scrap material, thin sheets and the like, at the bottom of the charge to serve as a radiation shield for the clam sheel doors and to absorb the remaining heat of the gases.

It will be understood that as soon as the preheating of the scrap has been completed, it will be transferred to an electric furnace or other final melting processes by being discharged through the bottom clam shell doors of the charging bucket or by dmping out the top of the heating vessel. The vessel may thereupon be returned, another charge of scrap introduced into it, the hood assembly replaced on the vessel and the preheating of the new charge begun.

EXAMPLE

In order to demonstrate the advantages of preheating scrap in accordance with this invention, three consecutive heats numbered 63993–4–5 were made from similar scrap charges in a commercial electric furnace. The first and third of these heats did not employ preheating. In the second heat a portion of the scrap, namely 44.3% was preheated before introduction into the electric furnace.

In preparation for the second heat 15,000# of pig iron, 25,000# Prolerized scrap, 30,000# of scrap designated as "#2 Bundles" and 30,000# of scrap designated as "#1 Heavy Melting" were introduced into the preheating vessel as desribed herein and were covered with 1,000# of coal. The scrap was heated for a time of twenty-eight minutes with a gas flow of 970 c.f.m. and an air flow of 16,000 c.f.m. which amounted to an excess of 78% of air at the burners and which limited the flame temperature to a maximum of 2550° F. The preheated scrap had a measured average temperature of about 1960° F. In the particular instance a delay of about thirty-five minutes occurred before it was possible to charge the preheated scrap into the electric furnace. During this time the scrap lost some of its heat.

Nevertheless, the electric furnace heat utilizing the preheated scrap showed an average of 78 kilowatt hours per net ton of steel tapped and an average production advantage of 11.8 net tons per hour in accordance with the following tabulation:

| Heat No. | Percent recovery of metallics | KWHRS/NT | NT/HR | Percent preheated scrap in the charge |
|---|---|---|---|---|
| 63993 | 91.5 | 474 | 26.9 | 0 |
| 63994 | 93.5 | 396 | 40.7 | 44.3 |
| 63995 | 93.8 | 474 | 30.8 | 0 |
| Average improvement | | 78 | 11.8 | |

This particular heat is an example of oxidation control, with a flame temperature less than stoichiometric ratio (about 3300° F.) utilizing coal for combustion of excess air that was introduced in the burners to limit flame temperature. Oxidation was controlled to less than 3.0% while operating with excess air in the critical oxidizing temperature range, although the prior art understanding would have led the worker to expect an oxidation level of approximately 20.0%.

The preheating of the scrap was conducted at a heating rate of about 28,000 B.t.u.'s per minute per ton, based on thermochemical values for coal and natural gas of 14,000 B.t.u./# and 925 B.t.u./s.c.f., respectively. The thermochemical values for coal and natural gas will vary depending upon the source thereof. For example, coal will vary from about 12,160 B.t.u./# to about 14,550 B.t.u./# and natural gas will vary from about 873 B.t.u./s.c.f. to about 1025 B.t.u./s.c.f. The thermochemical values for coal and natural gas are well known to those skilled in the art, or are readily obtainable from the local utility or handbook sources such as: Gaseous Fuels, American Gas Association, N. Y., 1948; Combustion Handbook, North American Manufacturing Co., 1951; Mechanical Engineers Handbook (5th edition), McGraw-Hill Book Co. Inc., 1951; or Chemical Engineers Handbook (3rd edition), McGraw-Hill Book Co. Inc., 1950. When the above given high and low thermochemical values are used to calculate the heating rate of the example, the median value thereof conforms to the heating rate of about 28,000 B.t.u. per minute per ton given above.

The embodiments of the invention in which an exlusive property or privilege is claimed are defined as follows:

1. A process of preheating scrap metal for use in electric furnaces, basic oxygen furnaces, and the like, which comprises charging scrap into a refractory lined vessel, and heating the scrap in the said vessel by means of flames from burners extending through a refractory lined top closure for said vessel, conducting said heating at a rate of at least 28,000 B.t.u.'s per minute per ton of scrap for a period of time up to about one-half hour there being orifices in the bottom area of said vessel of such size as to insure positive pressure in the mass of the scrap, whereby to cause hot products of combustion under said positive pressure to pass downwardly through said scrap and exit through said orifices, and then discharging the heated scrap directly into a furnace of the type set forth.

2. The method claimed in claim 1 including the step of employing air at said burners in quantities less than stoichiometric propotions whereby to minimize oxidation of said scrap metal.

3. The process claimed in claim 1 including the steps of using air and fuel in substantially stoichiometric proportions.

4. The process claimed in claim 1 including the step of producing oxidation during the said heating whereby to increase the heating effect by the admission of excess air to said vessel, and proportioning the degree of oxidation to the carbon content of the total charge in the furnace.

5. The process claimed in claim 1 wherein a layer of coal is placed adjacent the top of the scrap charge in the said vessel whereby the said layer initially protects the scrap from oxidation when excess air is employed to reduce flame temperature, whereby volatiles are driven from the said coal and downwardly through the said scrap during the combustion of the said volatiles with the excess air so as to minimize oxidation of the said scrap, and whereby the resultant coke is also combusted with said excess air with the formation of some carbon monoxide, so that oxidation of the said scrap is minimized and controlled at the desired level throughout the preheating operation.

6. The process claimed in claim 3 including the step of recirculating the gases from said orifices back into the top of said vessel.

7. The process claimed in claim 1 including the step of conducting said heating at a rate of at least 40,000 B.t.u.'s per minute per ton.

References Cited

UNITED STATES PATENTS

| | | | |
|---|---|---|---|
| 1,708,509 | 4/1929 | Loshboogh | 75—44 X |
| 2,805,143 | 9/1957 | Davies | 75—43 X |
| 3,180,724 | 4/1965 | Brooke | 75—43 X |
| 3,385,582 | 5/1968 | Eickelberg et al. | |

OTHER REFERENCES

Leary et al.: Bureau of Mines, Report of Investigations 5876; 1960.

Finkl: Article in Journal of Metals; January 1965; pp. 67–70.

HENRY W. TARRING II, Primary Examiner

U.S. Cl. X.R.

75—13, 44, 65; 263—15; 266—5